United States Patent [19]
Puckette

[11] Patent Number: 5,065,356
[45] Date of Patent: Nov. 12, 1991

[54] SHARED USE OF KEYBOARD AND MEMORY LINES

[75] Inventor: Robert B. E. Puckette, Corvallis, Oreg.

[73] Assignee: Hewlett-Packard Company, Palo Alto, Calif.

[21] Appl. No.: 285,991

[22] Filed: Dec. 19, 1988

[51] Int. Cl.⁵ .............................................. G06F 13/38
[52] U.S. Cl. ............................... 395/800; 364/925.6; 364/927.8; 364/928; 364/DIG. 2
[58] Field of Search ................... 364/200, 900, 709.09, 364/709.12; 341/26

[56] References Cited

U.S. PATENT DOCUMENTS

| | | | |
|---|---|---|---|
| 4,021,656 | 5/1977 | Caudel et al. | 364/709.09 |
| 4,333,089 | 6/1982 | Leininger | 364/709.09 X |
| 4,527,250 | 7/1985 | Galdun et al. | 364/900 |
| 4,725,816 | 2/1988 | Petterson | 341/26 |

Primary Examiner—Thomas M. Heckler

[57] ABSTRACT

The present invention describes a method and apparatus for interconnecting keyboard lines and memory lines to the same pins of a microprocessor or calculator chip. Resistors are placed in series with each keyboard line before interconnection to the memory lines and microprocessor pins to prevent disruption or degradation of the memory signal in the event a key on keyboard is depressed during a memory operation cycle. Means are provided to prevent memory operations during keyboard scan routines and means are provided to prevent keyboard scan routines from operating during memory operation cycles.

6 Claims, 2 Drawing Sheets

SHARED USE OF KEYBOARD AND MEMORY LINES

TECHNICAL FIELD

This invention relates to the field of electronic digital calculators and computers and specifically to the interconnection of a keyboard with both a memory chip and a microprocessor chip.

BACKGROUND OF THE INVENTION

Personal computers and sophisticated calculators both have a similar hardware structure. Originally, both used general purpose microprocessors as the core of the units with discrete devices interfacing displays, keyboards and memories. Discrete devices such as registers, drivers, buffers and latches were used as necessary to operate the display, keyboard or memory. Keyboards of the matrix type also had devices to scan the keyboard for closure of keys and a decoder circuit to convert the keystroke information into a form which could be used by the microprocessor. A common bus, typically on a printed circuit board, was used to interconnect the microprocessor to the various interface and operational devices.

With the advent of large-scale integration (LSI), and very large-scale integration (VLSI), more and more of these discrete devices became integrated directly onto the microprocessor chip. The microprocessor also grew in computing power from simple 4 bit architecture, to now over 32 bit architecture. Because the discrete devices were internal to the chip, the need for a common bus disappeared. All interconnections were now directly on the circuitry of the chip. As the internal structure of the microprocessor chip grew, however, the number of pins for external connection also grew. External pins are required for interconnection for the displays, power supplies, keyboards and external memories. Pins were also required to connect to external devices such as printers. It is not uncommon to find specialty microprocessors or calculator chips with as many as 108 pins. Printed circuit boards became simpler because fewer components needed to be mounted on the board, but they became more difficult to produce because of the extremely fine traces needed to interconnect to a chip with so many pins.

In a typical calculator, having an 8K memory of 8 bits and an 8 by 8 matrix keyboard, the minimum number of external pins on the microprocessor required, for strictly connecting the keyboard and memory, would be 41. This would include 16 pins for the keyboard, 13 for memory address lines, 8 for memory data lines and a minimum of two for memory control lines. By using common input, output register pins of the calculator chip for both the memory and the keyboard, the number of external pins and hence the mechanical complexity of the microprocessor chip can be greatly reduced.

BRIEF SUMMARY OF THE INVENTION

The current invention interconnects the keyboard and a memory chip through common lines to a microprocessor or calculator chip. Only one set of input, output registers are required for this interconnection. Resistors are placed in series with each keyboard column line and each keyboard row line to prevent degradation of memory signals should a key be depressed during a memory cycle. A keyboard scan routine is disabled during memory operations and memory operations are disabled during keyboard scan routines. The input, output register pins of the calculator chip which are connected in common with the keyboard and memory, continuously alternate between keyboard scan routines and memory operation routines.

DETAILED DESCRIPTION OF THE INVENTION

Figure 1:
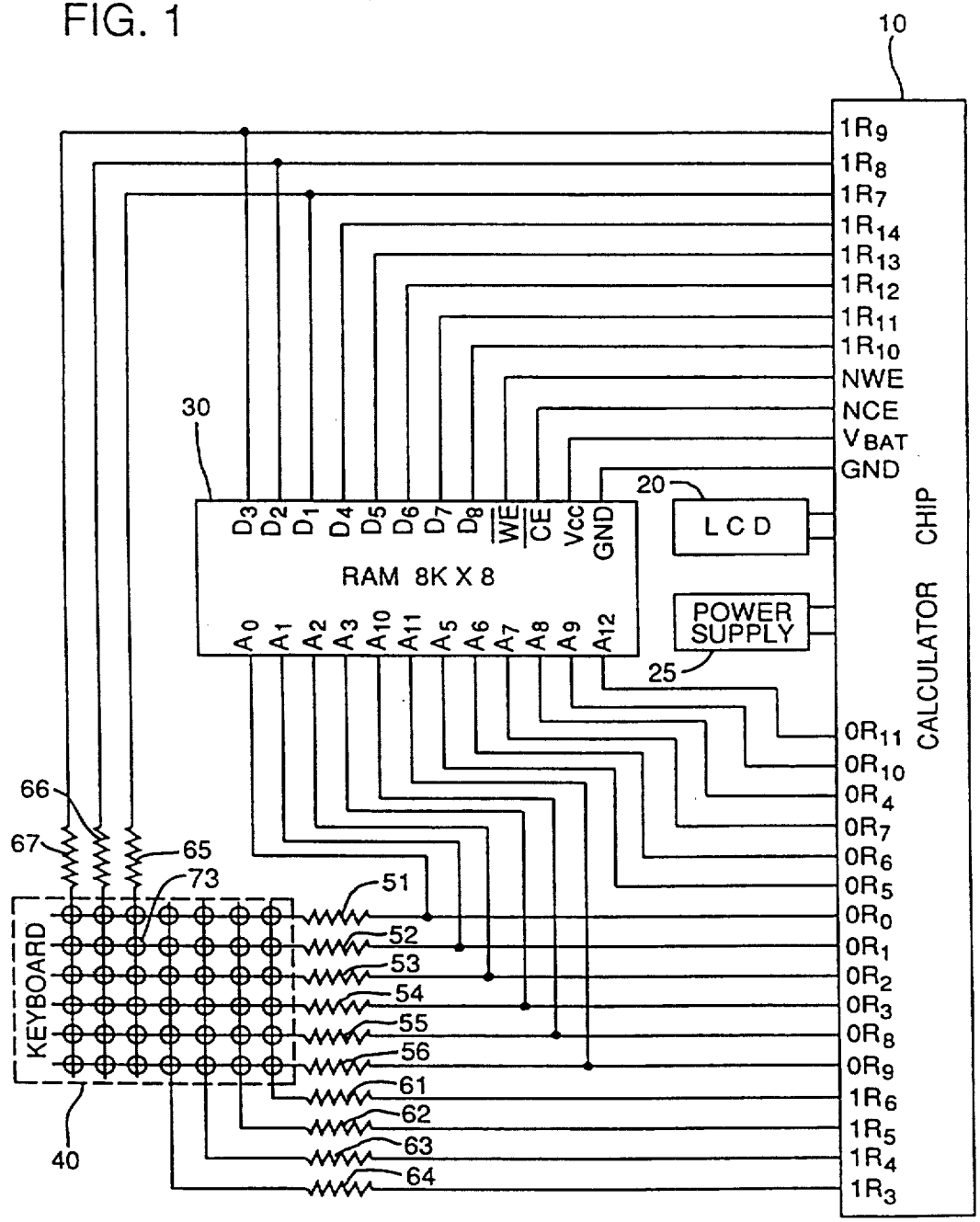
FIG. 1 is a block diagram of a calculator having shared use of keyboard and memory lines.

FIG. 1 is a schematic of a calculator. The heart of the calculator is a calculator chip 10. This calculator chip is a special purpose microprocessor with onboard clock, read only memory (ROM) and various drivers and registers. Prior to the present invention, the calculator chip had 180 external pins. The number of pins were greatly reduced by having a keyboard and a memory using common connecting pins as will be explained below. The external pins necessary to explain the present invention include a memory chip enable pin, NCE and a memory read/write pin, NWE. When pin NWE has a low logic level imposed upon it, the microprocessor chip can write to the memory during the time that the chip enable pin NCE is at a low logic level. When the chip enable pin, NCE, is at a low logic level, and the write enable pin NWE is at a high logic level, then the microprocessor chip can read from the memory.

A Power pin $V_{BAT}$ and a ground pin GND is provided for powering external devices. There is at least one set of input register pins $IR_3$ - $IR_{14}$ and one set of output register pins $OR_0$ - $OR_{11}$ available on the calculator chip. These register pins can be any number, the specific number shown are only for explanation of the present invention. A liquid crystal display (LCD) 20 is also connected to the calculator chip. The specific number of pins necessary for the interconnection to the LCD is not detailed because this is not necessary for explanation of the present invention. Similarly, a power supply 25 is provided, and again, its specific interconnection pins also are not detailed.

An external memory 30 is provided. The specific example shown is an 8K random access memory (RAM) storing 8-bit data. This memory chip has address lines $A_0$ - $A_{12}$, data lines $D_1$ - $D_8$, control lines WE and CE, and power connections V and GND. Other pins are available on most memory chips but have been deleted for purposes of explaining this invention.

A matrix keyboard 40 is also provided. The specific keyboard shown is a 6×7 matrix or 42 key keyboard. It will be understood by one skilled in the art that any size keyboard may be used. The keyboard is divided into rows and columns. The column connecting lines have resistors, 51–56 wired in series with them while the row-connector lines have resistors 61–67 wired in series with them. In the present example, all of the resistors 51–56 and 61–67 are 7 K ohm resistors. The purpose of the resistors will be explained below.

In a conventional calculator, a set of input/output pins are required for a keyboard and a separate set of input/output pins is required for an external memory. In the present invention, a common set of the input/output pins of the calculator chip are connected to both the keyboard and the memory. Specific interconnections are illustrated in FIG. 1.

Output register pins of the calculator chip $OR_0$ is connected to address Pin $A_0$ of the memory chip and also interconnected through a resistor 51 to the first column of the keyboard. Output register pin $OR_1$ is connected to address line $A_1$ of the memory chip and also to a resistor 52 to the second column of the keyboard. Output register $OR_2$ is connected to address pin $A_2$ of the memory chip and through a resistor 53, to the third column of the keyboard. Output register pin $OR_3$ is connected to address line $A_3$ and to resistor 54 of the fourth column of the keyboard. Column 5 of the keyboard is interconnected through resistor 55 to output register pin $OR_8$ and address line $A_{10}$. Output resistor pin $OR_9$ of the calculator chip 10 is interconnected to address line $A_5$ of the memory chip 30, and through resistor 56 to the sixth column of keyboard 40.

As can be seen from the above interconnections of the keyboard column connecting lines, memory address lines and output resistors it is not necessary to interconnect the column lines, the register pins, and the address pins in a sequential manner. It is merely necessary that the calculator chip when performing its functions know which lines are interconnected. This will become clear below as an explanation of the operation of a keyboard scan routine and the memory operation routine is explained.

In looking at the row interconnections of the keyboard, it can be seen that the first row is connected to input register $IR_6$ through resistor 61 to the first row of keyboard 40. Similarly, input register pin $IR_5$ is interconnected through resistor 62 to the second row of the keyboard. Input register pin $IR_4$ is connected through resistor 63 to the third row of the keyboard. Input register pin $IR_3$ is connected through resistor 64 to the fourth row of keyboard 40. As can be seen, none of these rows are interconnected to the memory. It is not necessary to have interconnections between the keyboard and the memory for each line. The limitation is the number of input and output register pins available for the various functions.

For purposes of explanation, keyboard row 5 is interconnected through resistor 65 to input register pin $IR_7$ of the calculator chip and to data pin $D_1$ of the memory chip. Row 6 is connected through resistor 66 to both input register pin $IR_8$ of the calculator chip and data pin $D_2$ of the memory chip. Completing the interconnections between the keyboard and the memory chip, keyboard row line 7 is interconnected through resistor 67 to input register pin $IR_9$ of the calculator chip and data pin $D_3$ of the memory chip.

It will be noted that memory chip address lines $A_5$, $A_6$, $A_7$, $A_8$, $A_9$, $A_{12}$ are connected directly to output register pins on the calculator chip. Similarly, data interconnection pins of the memory chip $D_4$, $D_5$, $D_6$, $D_7$, and $D_8$ are interconnected directly to the input register pins of the calculator chip. As will be seen by the explanation below, any number of combinations of interconnections are possible. The primary controlling factor is that the resistors 51–56 and 61–67 are scaled such that, during a memory operation the memory signal is not degraded, should a key, for instance, key 73, be depressed during memory operation.

Figure 2:
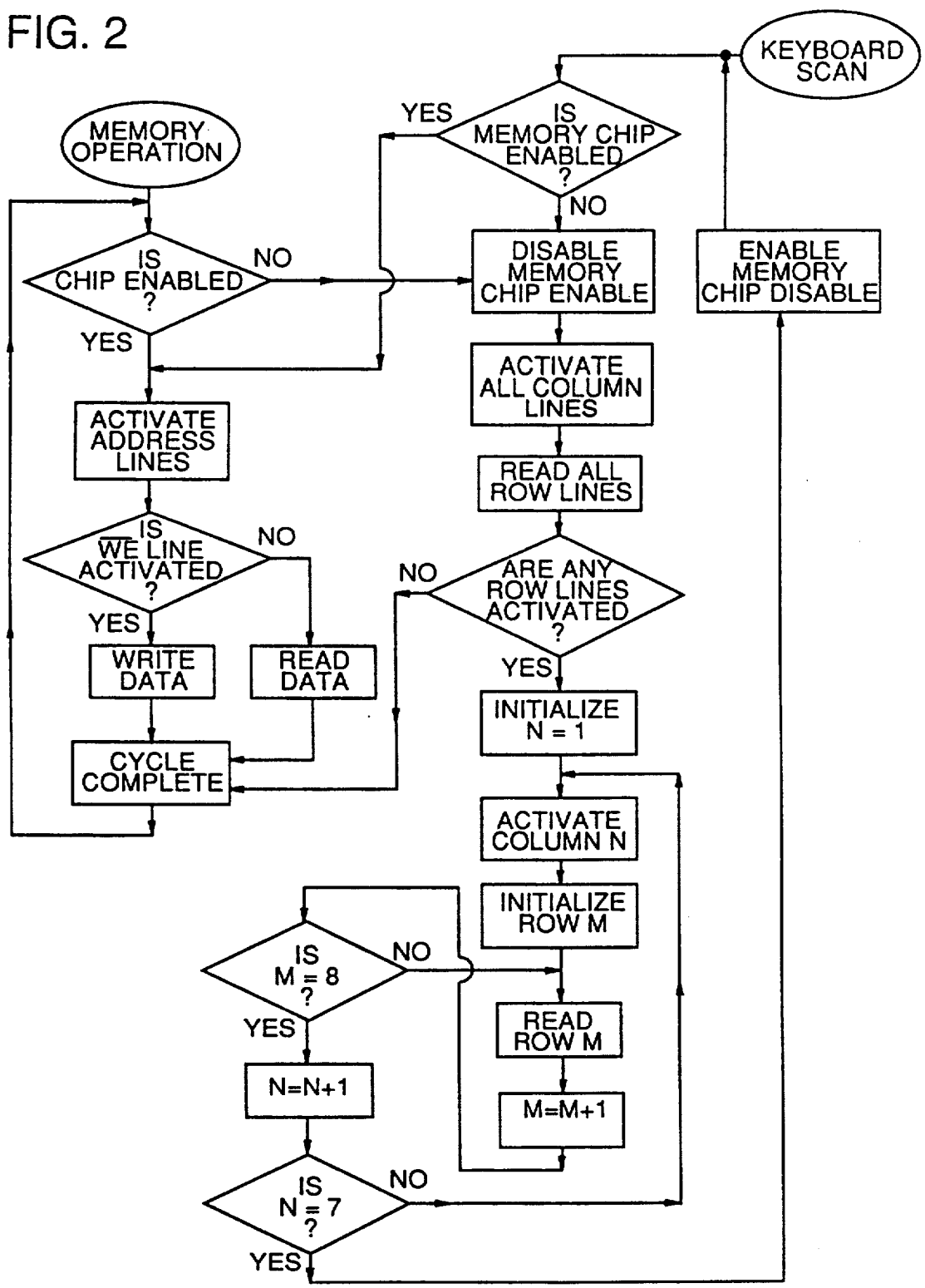
FIG. 2 is a logic diagram of the operation of keyboard scan routines and memory operation routines.

FIG. 2 shows the logic diagram that the memory chip performs for a keyboard scan and for memory operation. It will be understood that these simple, logic functions can either be software initiated in the read only memory of the calculator chip or they can be wired directly in firmware logic on interconnections directly on the calculator chip.

Beginning with the keyboard scan routine of FIG. 2, the calculator chip determines whether or not the memory chip is enabled. This means that the calculator chip determines whether or not a NCE pin has a low logic level. If it does not, then the calculator chip disables this pin so it cannot reach a low logic level. This means that during the keyboard scan operation, the memory chip is disabled and you can neither write to nor read from the memory chip. The next function that happens is that all keyboard column lines are activated. This means that output register pins $OR_0$, $OR_1$, $OR_2$, $OR_3$, $OR_8$ and $OR_9$ have a high logic level impressed upon them. This high logic level is approximately 3.5 volts. During the time that these output register pins have a high logic level impressed on these, the calculator chip simultaneously looks at input register pins $IR_6$, $IR_5$, $IR_4$, $IR_3$, $IR_7$, $IR_8$, and $IR_9$. The purpose is to see if any of these row lines are reading a high level. Since the calculator chip is a complimentary metal oxide semi-conductor chip (CMOS) there is very little current draw through the circuit in reading the input register pins. Since this is true, there is very little voltage drop across resistors 51 through 56 or 61 through 67. Therefore, should a key such as key 73 be depressed, the 3.5 source voltage is impressed on the input register pin $IR_7$. If no high voltages are read, the keyboard scan routine is canceled and the memory operation takes over. If, however, any of the input register pins read high during keyboard scan, then sequentially the output register pins are activated and sequentially for each activation the input register pins are read. For instance, output register $OR_0$ is forced to a high logic level. Each one of the row input register pins is read sequentially to see if a key is closed or depressed. If none are read, then the next column line, $OR_1$ is activated, and sequentially all of the input register pins are read.

For purposes of explanation, let us assume that keyboard 73 is depressed. Therefore, 3.5 volts are impressed on output register pin $OR_1$. As the input register pins are sequentially read, it is found that input register $IR_7$ is high. This is placed in memory as a keystroke closure. Once all of the output registers have been sequentially activated, and all of the input registers have been sequentially read, then the memory chip is again enabled to see if a memory routine is required. If a memory routine is required, the chip enable NCE of the calculator chip goes to a low logic level. At this time, the memory address lines are activated to call for a specific memory address. Once that specific memory address has been accessed, then the calculator chip determines whether data is to be read from or written to the memory. If the data is to be read, then the input registers are scanned to determine which ones have a high logic level and which ones have a low logic level. This 8-bit data is then transferred to the calculator chip to perform whatever function is necessary. If, however, the NWE line is at a low logic level, then input register pins are activated and data is written to the memory chip. Once this memory cycle is completed, the memory operation continues until the memory chip is no longer enabled, in other words when the NCE memory chip is no longer low. When this occurs, then the keyboard scan routine again takes over and the keyboard is scanned for key closure. The calculator chip continuously performs either memory operations or keyboard scan operations.

Should during a memory operation, a key, such as key number 73, of keyboard be depressed, resistor 52 and 65 are now in the circuit. These present a high impedance to any signal that would be impressed on output register pin $OR_1$. Since the current draw in the memory chip to address $A_1$ is so low, and resistance 61 and 65 are high, then no current will flow through the resistors to input register $IR_7$, caused by a voltage impressed on output register $OR_1$. Therefore, the resistors do not degrade the memory operation signal should a key be depressed during memory operation routines.

Industrial Applicability

The present invention is useful in the calculator and computer fields by allowing a VSLI calculator chip or a microprocessor chip to have fewer external connection pins by interconnecting both an external memory chip and a keyboard to common pins in the calculator chip or microprocessor chip.

Although the preferred, but not the exclusive embodiment of the invention has been described, it is to be understood that many modifications and variations both in its structure and operation equivalent in the arts without departing from the spirit of the present invention. The invention, therefore, should only be limited in its various modifications and variations as is defined in the scope of the appended claims.

I claim:

1. A calculator comprising:
   a calculator chip;
   a display coupled to the calculator chip;
   a power supply coupled to the calculator chip;
   a memory chip coupled to the calculator chip;
   a keyboard having a plurality of keys interconnected to both said memory and said calculator chip;
   keyboard scan means for detecting closure of a key on said keyboard;
   memory operation means for writing to and reading from said memory chip;
   means responsive to the keyboard scan means for disabling said memory operation means during a keyboard scan; and
   means connected between the keyboard and the memory chip to prevent degradation of a memory signal during memory operation should a key of said keyboard be depressed during memory operation.

2. A calculator as recited in claim 1 wherein said means to prevent degradation of a memory signal comprises resistors connected in series between said keyboard and said memory chip and said calculator chip.

3. A calculator comprising:
   a calculator chip having a plurality of output register pins for sending data and a plurality of input register pins for receiving data;
   a keyboard having a plurality of connecting lines connecting the keyboard to the output register pins of the calculator chip and a plurality of connecting lines connecting the keyboard to the input register pins of the calculator chip;
   a memory chip having a plurality of address pins each connected at a node to a keyboard connecting line for receiving an address for a memory location from the output registers of the calculator chip and a plurality of data pins each connected at a node to a keyboard connecting line for communicating data between the memory chip and the input register pins of the calculator chip; and
   a resistor connected in each connecting line between the keyboard and the node to the address or data pin for preventing operation of the keyboard from affecting the operation of the memory chip.

4. The calculator of claim 1 wherein the impedance of the resistor is greater than the impedance of the address or data pin connected at the node.

5. A calculator comprising:
   a calculator ship having a plurality of output register pins for sending data and a plurality of input register pins for receiving data;
   a keyboard having a plurality of column connectors and a plurality of row connectors;
   a memory chip having a plurality of memory pins for receiving an address for a memory location from the output registers of the calculator chip and for communicating data between the memory chip and the input register pins of the calculator chip; and
   a plurality of connecting lines for the input and output register pins of the calculator chip, each line having a node for connecting a register pin to both a keyboard connector and a memory pin; and
   impedance means within each connecting line for preventing operation of the keyboard from affecting operation of the memory chip.

6. In a calculator, a method of sharing register pins of a calculator chip between a memory chip and a keyboard during calculator operation, comprising:
   providing a connecting line for connecting each of a plurality of output register pins of the calculator chip to both an address pin of the memory chip and a keyboard connector of the keyboard;
   providing a connecting line for connecting each of a plurality of input register pins of the calculator chip to both a data pin of the memory chip and a keyboard connector of the keyboard;
   disabling memory operations during a keyboard scan routine; and
   preventing degradation of memory signals within a connecting line should a keyboard key be pressed during a memory operation.

* * * * *